United States Patent [19]
Imai

[11] Patent Number: 5,930,037
[45] Date of Patent: Jul. 27, 1999

[54] STEREOSCOPIC DISPLAY APPARATUS WHICH PREVENTS INVERSE STEREOSCOPIC VISION

[75] Inventor: Masao Imai, Tokyo, Japan

[73] Assignee: NEC Corporation, Japan

[21] Appl. No.: 08/841,161

[22] Filed: Apr. 29, 1997

[30] Foreign Application Priority Data

Apr. 30, 1996 [JP] Japan .................................. 8-109058

[51] Int. Cl.⁶ ............................ G03B 21/60; G02B 27/22
[52] U.S. Cl. .......................... 359/463; 359/458; 359/462; 348/59
[58] Field of Search ..................... 359/463, 462, 359/458, 456, 619; 349/15; 348/51, 54, 55, 56, 57, 58, 59, 60

[56] References Cited

U.S. PATENT DOCUMENTS 5,528,420  6/1996  Momochi ................................. 359/463
5,663,831  9/1997  Mashitani et al. ...................... 359/463

FOREIGN PATENT DOCUMENTS 114914  4/1942  Australia ............................... 359/619

OTHER PUBLICATIONS

The Journal of Three Dimensional Images, vol. 7, No. 2, Mar., 1993, pp. 4–7.

Primary Examiner—Cassandra Spyrou
Assistant Examiner—Jennifer Winstedt
Attorney, Agent, or Firm—Ostrolenk, Faber, Gerb & Soffen, LLP

[57] ABSTRACT

A stereoscopic display apparatus is so constructed that right-eye and left-eye images as parallax images and non-display portions are formed periodically and cyclically on a display device. When the viewer watches the apparatus at a correct position, he is capable of stereoscopic vision. When the head of the viewer is moved so that he sees the left-eye images through the right eye, he sees the non-display portions through the left eye. When the head of the viewer is moved so that he sees the right-eye images through the left eye, he sees the non-display portions through the right eye.

28 Claims, 11 Drawing Sheets

L:LEFT-EYE IMAGE
R:RIGHT-EYE IMAGE
B:NON DISPLAY PORTION (BLACK)

L: LEFT-EYE IMAGE
R: RIGHT-EYE IMAGE

L:LEFT-EYE IMAGE
R:RIGHT-EYE IMAGE
B:NON DISPLAY PORTION (BLACK)

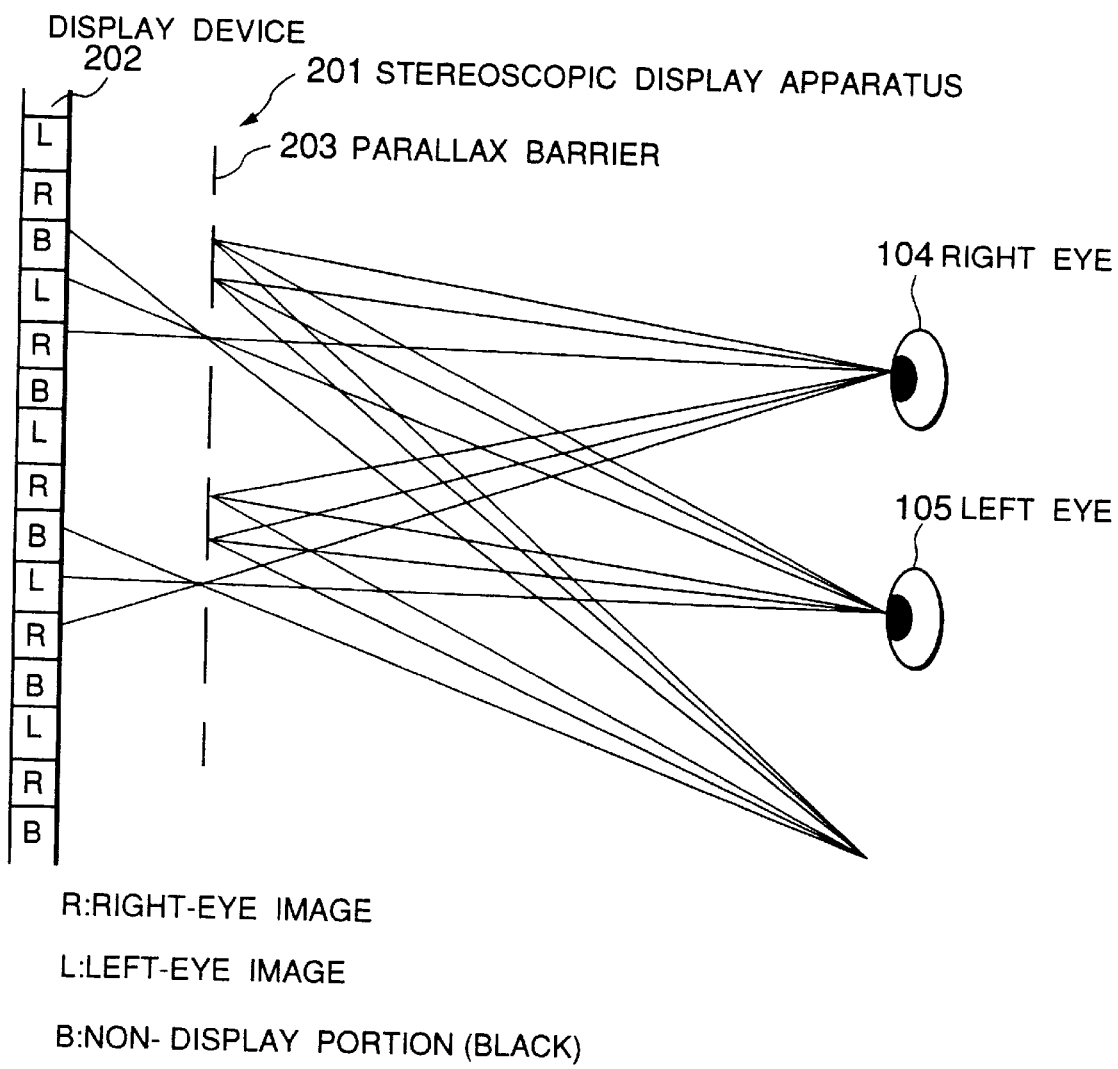

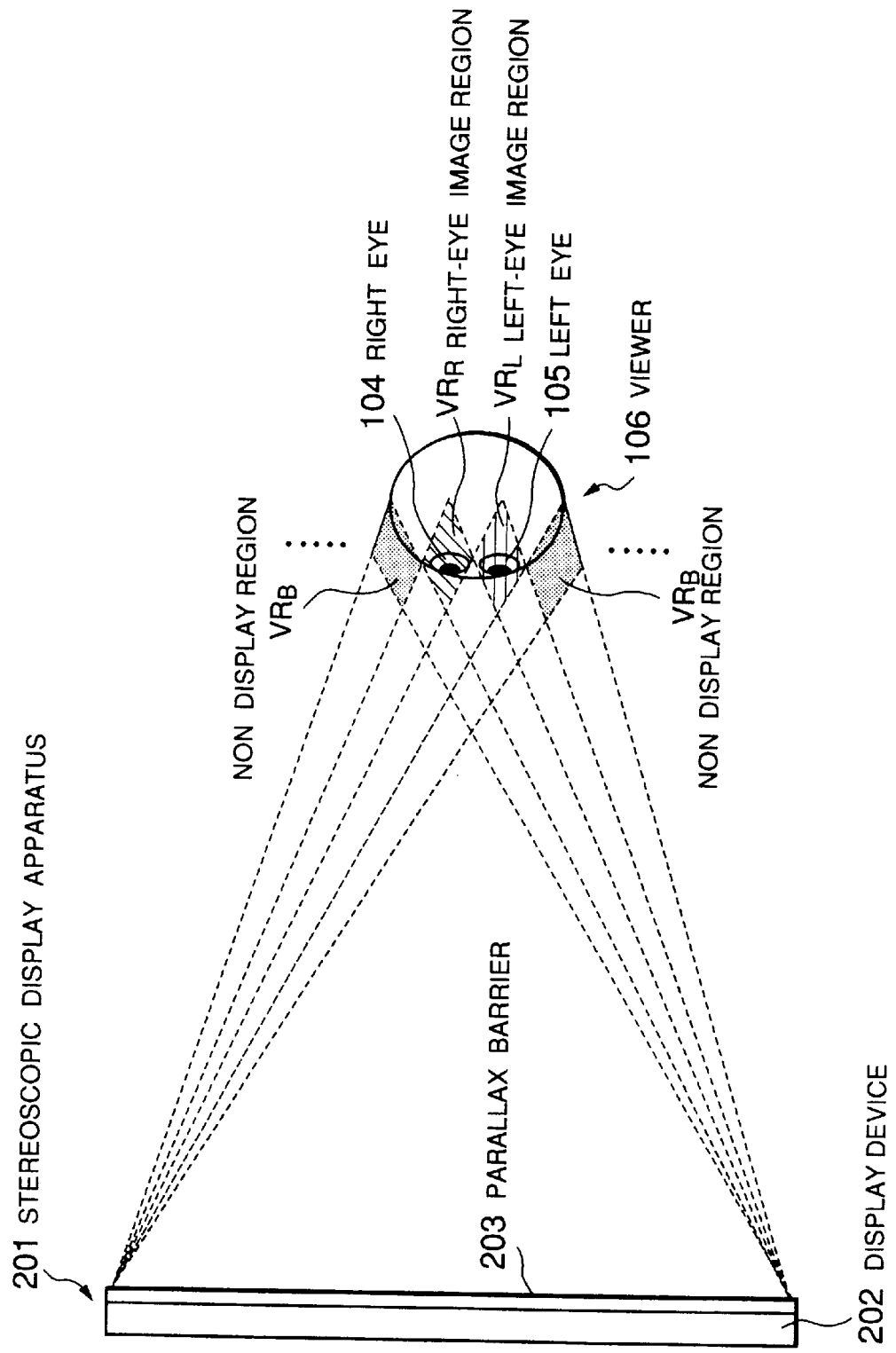

STEREOSCOPIC DISPLAY APPARATUS WHICH PREVENTS INVERSE STEREOSCOPIC VISION

BACKGROUND OF THE INVENTION

1. Field of the Invention

The present invention relates to a stereoscopic display apparatus and, more specifically, to a stereoscopic display apparatus which allows a viewer to see a stereoscopic image or three-dimensional image without wearing special glasses.

2. Description of the Related Art

Among conventional stereoscopic display apparatuses for displaying a stereoscopic or three-dimensional image are an apparatus which provides pieces of image information having a binocular parallax independently of each other before the right and left eyes, an apparatus which sequentially displays sectional images of an object in synchronism with movement of a mobile screen, and an apparatus using a hologram. However, the apparatus which moves a screen and the apparatus using a hologram have difficulty displaying a moving image because of a large amount of information thereof. For this reason, at present, the development of stereoscopic display apparatuses is mainly directed to the type which displays a stereoscopic image by using binocular parallax images.

Constructed by using a conventional display device such as a cathode-ray tube (CRT) or a liquid crystal display, the stereoscopic display apparatus which displays a stereoscopic image by using binocular parallax images can produce a stereoscopic image relatively easily. In one type of stereoscopic display apparatus utilizing the principle of binocular parallax, a viewer wears special glasses such as polarizing glasses or liquid crystal shutter glasses. In the other type, a viewer sees a stereoscopic image through a special optical element such as a lenticular lens or a parallax barrier serving as a parallax image separating means which element is provided on a display surface.

Of the above two types of apparatuses, the latter type has an advantage, over the former type, of allowing a viewer to see a stereoscopic image without wearing special glasses because parallax images are separated from each other spatially and provided before the respective eyes independently. Therefore, the latter type of stereoscopic display apparatus not requiring the use of glasses will be described below taking, as an example, a type which uses a lenticular lens as the parallax image separating means.

FIG. 1 schematically illustrates the configuration of an example of a conventional lenticular-type stereoscopic display apparatus using a lenticular lens. As shown in FIG. 1, a conventional lenticular-type stereoscopic display apparatus 1 is constituted of a display device 2 and a lenticular lens 3. While the apparatus 1 is of a stereogram type which uses two kinds of parallax images, i.e., a right-eye image R and a left-eye image L, a panoramagram type apparatus which uses three or more parallax images may be constructed in a similar manner. The lenticular lens 3 is composed of a number of long and narrow cylindrical lenses arranged in one direction.

The focal plane of the cylindrical lenses is made a display surface of the display device 2, and a stereoscopic image is displayed on the display surface. A stereoscopic image is formed by dividing a right-eye image R and a left-eye image L each bearing binocular parallax information into vertically long striped images in accordance with the number of cylindrical lenses, extracting those images, and then rearranging those images alternately. In displaying a stereoscopic image, the positions of the display device 2 and the lenticular lens 3 are adjusted so that divided right-eye images R and left-eye images L are displayed at locations that are determined by the positions of the cylindrical lenses and a right eye 4 and a left eye 5 of a viewer.

When the viewer watches this lenticular-type stereoscopic display apparatus 1, the right eye 4 sees only the right-eye images R and the left eye 5 sees only the left-eye images L. The viewer can recognize the displayed image as being stereoscopic by fusing the images R and L within his brains.

FIG. 2 schematically illustrates viewing regions of the conventional lenticular-type stereoscopic display apparatus 1. In the lenticular-type stereoscopic display apparatus 1 constituted of the display device 2 and the lenticular lens 3, right-eye images R and left-eye images L that are displayed on the display device 2 are converged at positions that are distant from the stereoscopic display apparatus 1, to form right-eye image regions $VR_R$ and left-eye image regions $VR_L$. That is, if the stereoscopic display apparatus 1 is watched by one eye from one of the right-eye image regions $VR_R$, only the right-eye images R are seen over the entire screen. Similarly, if the stereoscopic display apparatus 1 is watched by one eye from one of the left-eye image regions $VR_L$, only the left-eye images L are seen over the entire screen. Therefore, if the right eye 4 and the left eye 5 of the viewer 6 are located in a right-eye image area $VR_R$ and a left-eye image area $VR_L$, respectively, the viewer 6 can recognize a stereoscopic image by fusing those images within his brains.

The head of the viewer 6 is positioned such that first entirely different, i.e., distinguishable, right-eye and left-eye images R and L are provided. However, the width of the right-eye image regions $VR_R$ and the left-eye image regions $VR_L$ is very small, i.e., smaller than the eye span of the viewer 6 which is 60–65 mm. Therefore, the viewer 6 is obliged to watch the apparatus 1 with his head fixed in a state that the right eye 4 and the left eye 5 are located in a right-eye image region $VR_R$ and a left-eye image region $VR_L$, respectively.

If the right eye 4 and the left eye 5 of the viewer 6 are located in a left-eye image region $VR_L$ and a right-eye image region $VR_R$, respectively, not only is stereoscopic vision disabled but also there occurs inconsistency between stereoscopic information obtained from binocular parallax and that obtained from planar images that are seen by the respective eyes (see "The Journal of Three Dimensional Images", Vol. 7, No. 2, March 1993). This type of inverse stereoscopic vision (pseudoscopic image) makes the viewer 6 feel uncomfortable and resultingly feel fatigued. In general, right-eye and left-eye images are different from each other only slightly (i.e., a parallax is very small), they are difficult to distinguish. Therefore, there may occur a case that the viewer 6 watches the apparatus 1 for a long time in the state of inverse stereoscopic vision and is fatigued cumulatively.

In summary, in the conventional lenticular-type stereoscopic display apparatus, right-eye image regions $VR_R$ and left-eye image regions $VR_L$ are arranged periodically at the viewing position of the viewer 6 and their width is very small. Therefore, if the viewer 6 moves his head only slightly, the state of inverse stereoscopic vision is established to make him feel fatigued. Further, once the head position is deviated, the viewer 6 cannot know the correct position any more, so that he may watch the apparatus 1 for a long time in the state of inverse stereoscopic vision.

The above problems are common to stereoscopic display apparatuses which allow a viewer to see a stereoscopic image or three-dimensional image without using special glasses by spatially separating parallax images and providing separated images independently before the respective eyes, such as an apparatus using a projection-type display device and a lenticular lens, an apparatus using a plurality of projection-type display devices and two lenticular lenses, and an apparatus using a parallax barrier as a parallax image separating means in addition to the above-described stereoscopic display apparatus which uses a direct-view display device and a lenticular lens.

SUMMARY OF THE INVENTION

An object of the present invention is to provide a stereoscopic display apparatus of a type that allows a viewer to see a stereoscopic or three-dimensional image without establishing inverse stereoscopic vision.

Another object of the present invention is to provide a stereoscopic display apparatus and a displaying method that allows a viewer to easily find a region where he is capable of seeing stereoscopic vision.

According to the present invention, the stereoscopic display apparatus is comprised of a display device which displays a plurality of parallax images and a predetermined image different from the parallax images such that the parallax images are repeated on a pixel-by-pixel basis cyclically with the predetermined image intervening in a repetitive display pitch of the parallax images. The parallax images and the predetermined image displayed on the display device is separated by a parallax image separator provided on one side of the display device and thereby parallax image regions and predetermined image regions are formed periodically at positions distant from the display device.

Therefore, the parallax image regions are periodically formed at the viewing position of a viewer and the predetermined image region is formed in the repetition pitch of the parallax image regions. This provides the following viewing situation. That is, when both of the right and left eyes of the viewer are respectively located in two adjacent ones of the plural kinds of parallax image regions, the viewer can see a stereoscopic image normally. On the other hand, when the head of the viewer is moved so that one of his right and left eyes is located in one of the plural kinds of parallax images which is adjacent to a predetermined image region and the other eye is located in the predetermined image region, the eye located in the predetermined image region cannot see any image.

BRIEF DESCRIPTION OF THE DRAWINGS

FIG. 6 is a schematic plan view illustrating the configuration of a stereoscopic display apparatus according to a second embodiment of the invention;

FIG. 7 schematically illustrates viewing regions of the stereoscopic display apparatus of FIG. 6;

DESCRIPTION OF THE PREFERRED EMBODIMENTS

First Embodiment

Figure 1:
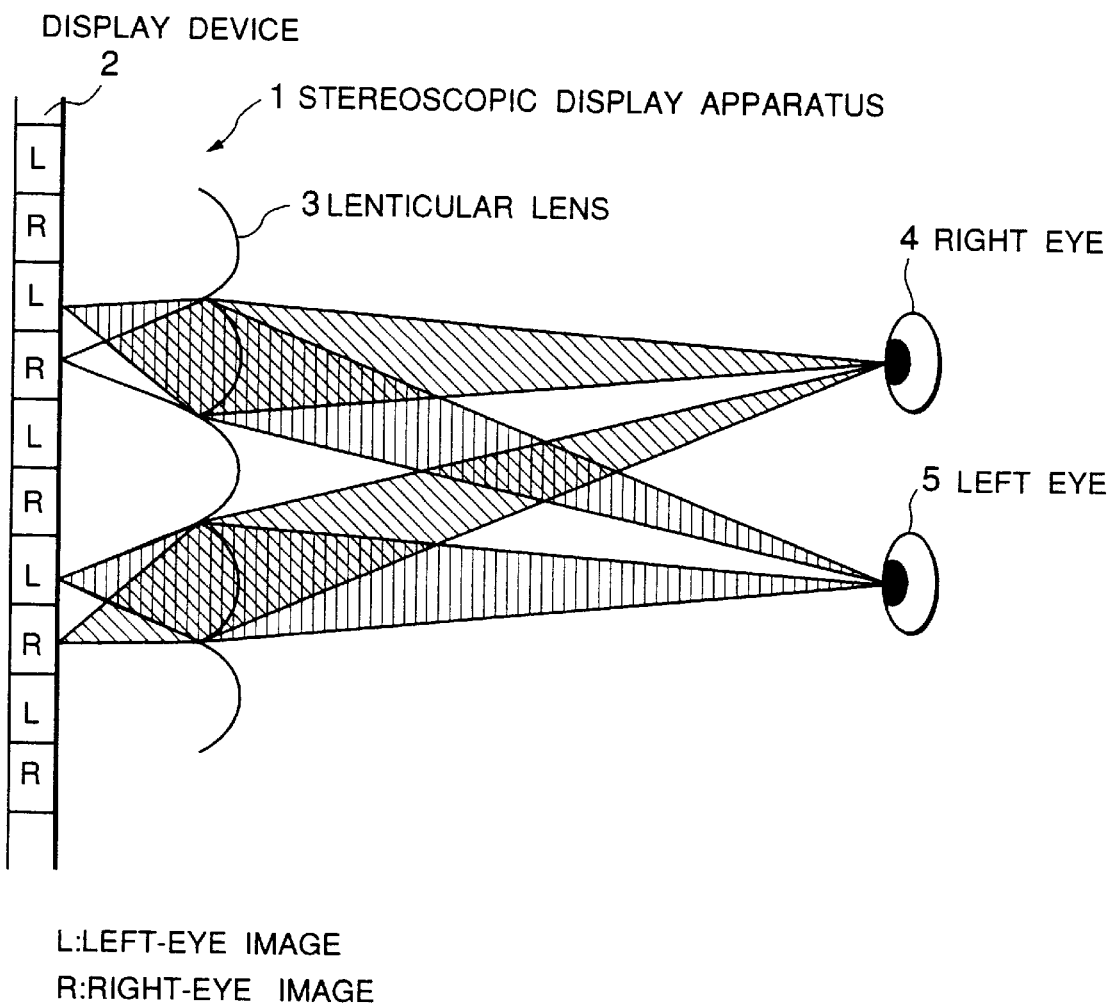
FIG. 1 is a plan view schematically illustrating the configuration of an example of a conventional stereoscopic display apparatus.
Figure 2:
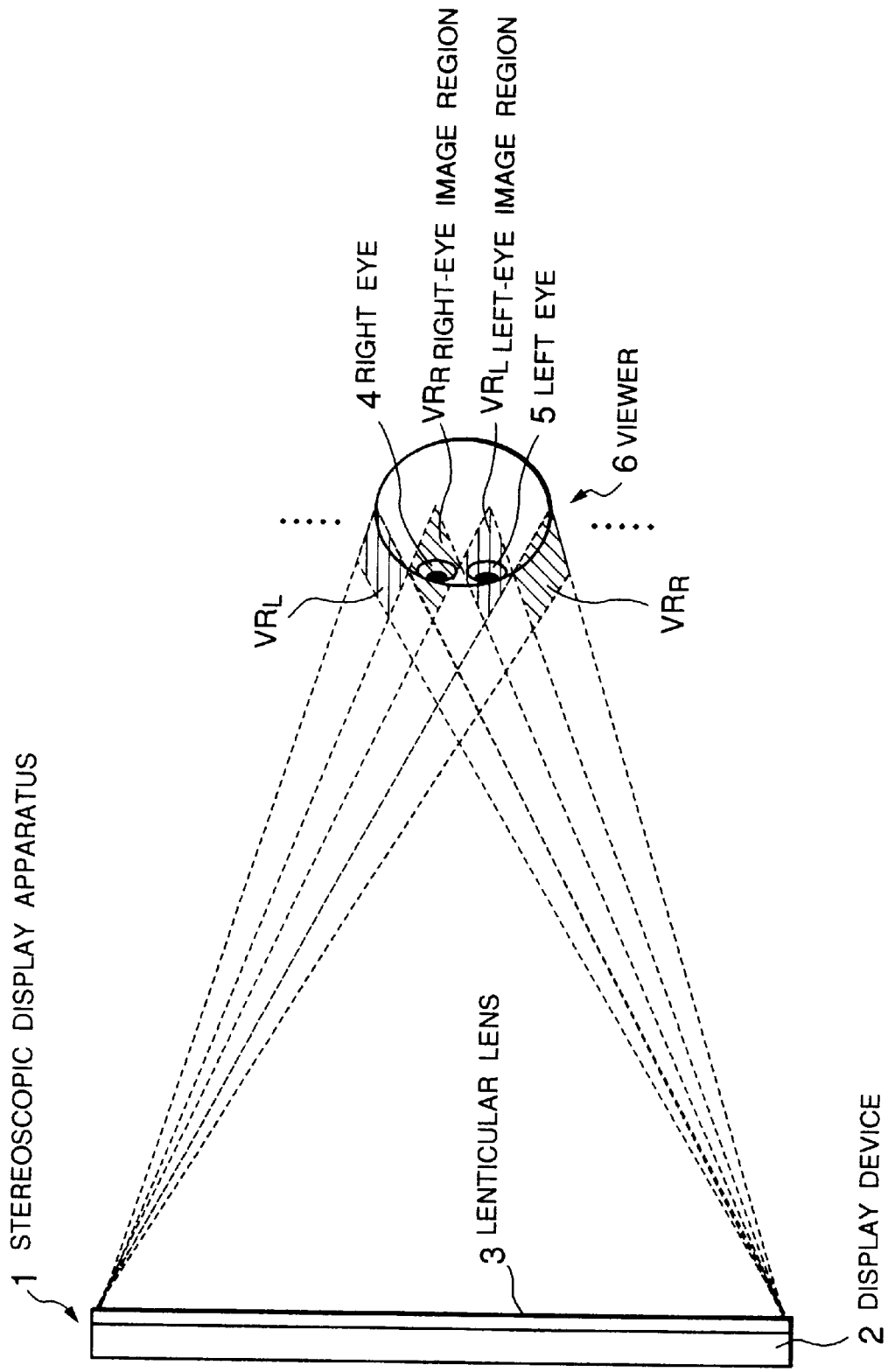
FIG. 2 schematically illustrates viewing regions of the conventional stereoscopic display apparatus of FIG. 1.
Figure 3:
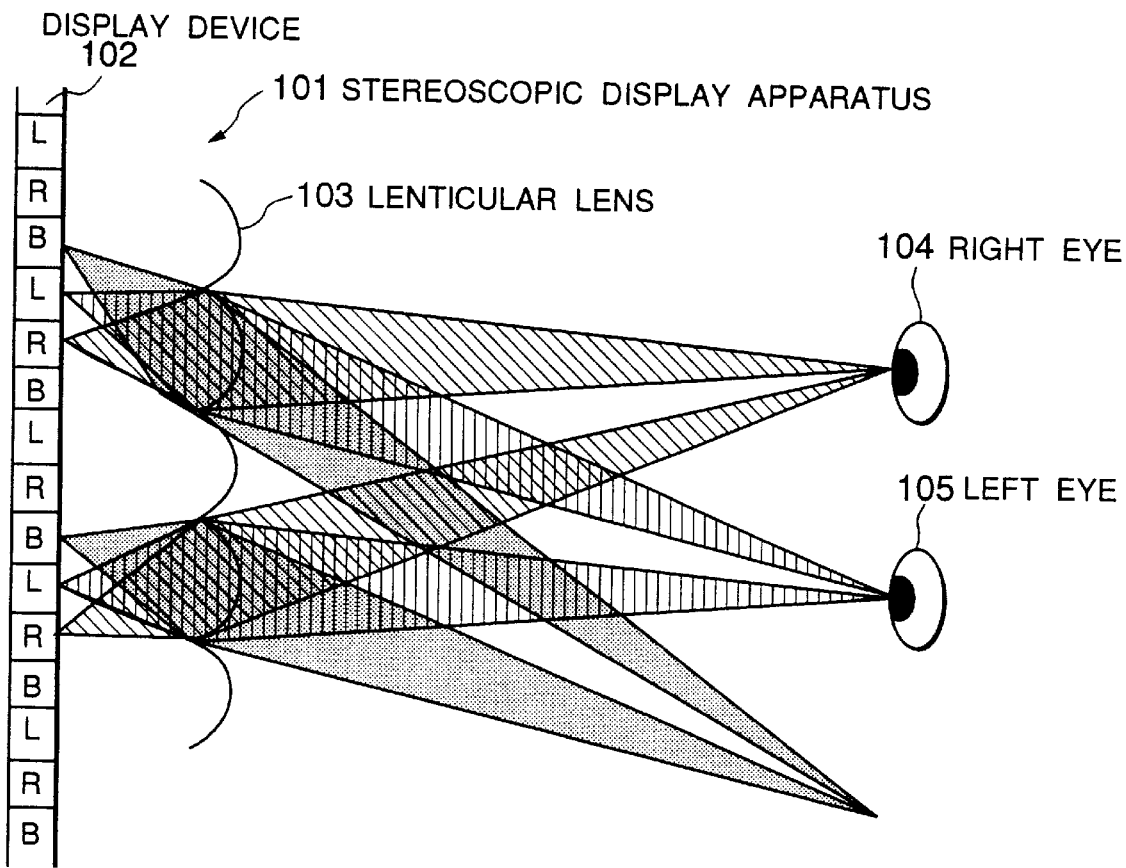
FIG. 3 is a schematic plan view illustrating the configuration of a stereoscopic display apparatus according to a first embodiment of the present invention.

Referring to FIG. 3, a stereoscopic display apparatus 101 is constituted of a display device 102 and a lenticular lens 103 that is opposed to the front surface of the display device 102 and serves as a parallax image separating means. In the display device 102, right-eye images R and left-eye images L as parallax images and non-display portions B are formed periodically and cyclically so as to have the same width. The apparatus 101 is so constructed that at a certain viewing position a right eye 104 of a viewer can see only the right-eye images R and his left eye 105 can see only the left-eye images L.

Figure 4:
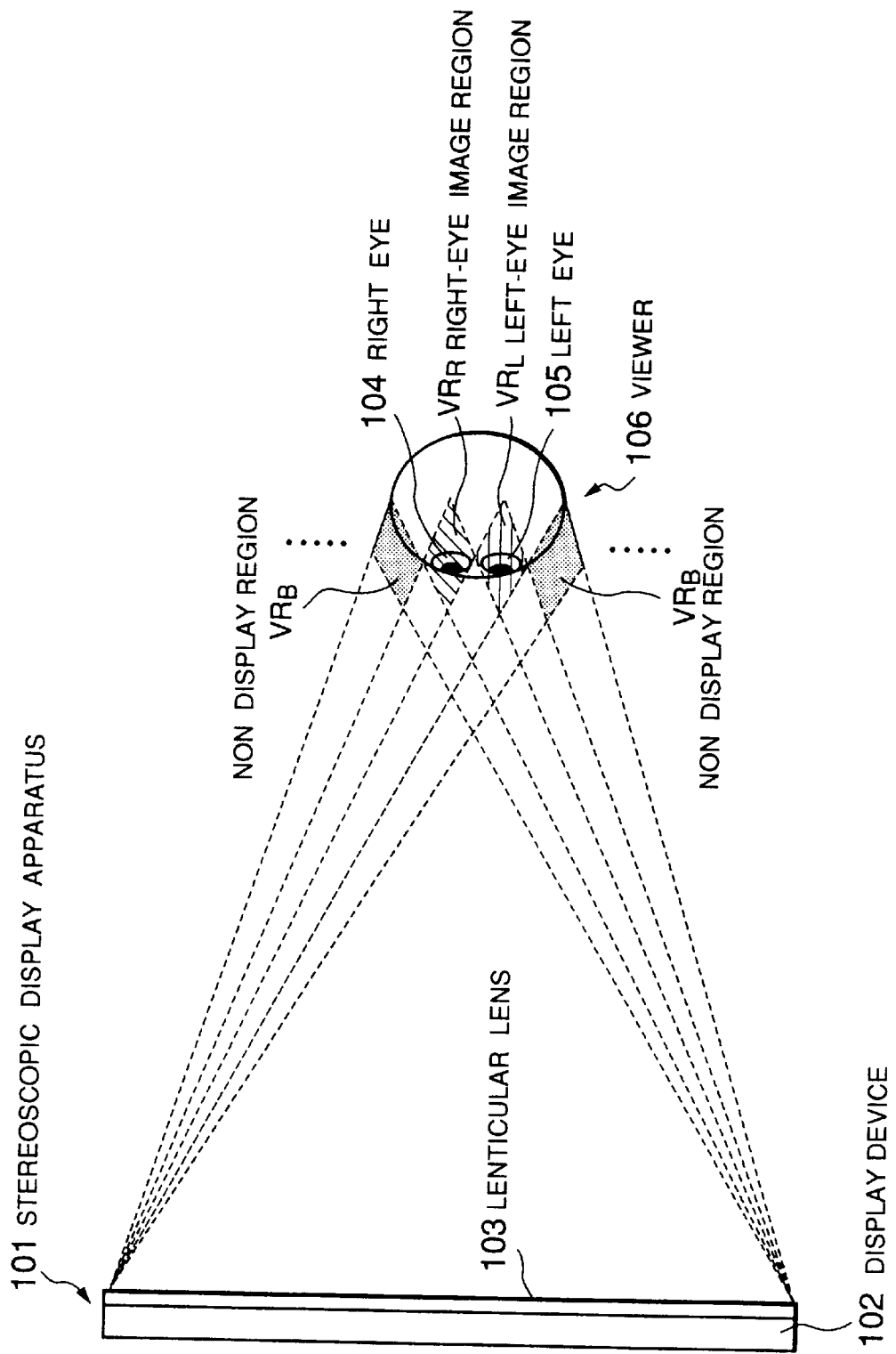
FIG. 4 schematically illustrates viewing regions of the stereoscopic display apparatus of FIG. 3.

As shown in FIG. 4, light beams coming from the right-eye images R. left-eye images L, and non-display portions B that are displayed on the display device 102 are converged at certain positions that are distant from the stereoscopic display apparatus 101, to form right-eye image regions $VR_R$, left-eye image regions $VR_L$, and non-display regions $VR_B$ which are arranged periodically. The width of the respective regions is approximately 60–65 mm which is the eye span of a viewer 106.

In cases where the stereoscopic display apparatus 101 is watched through one eye from one of the right-eye image regions $VR_R$, only the right-eye images R are seen over the entire screen. Similarly, if the stereoscopic display apparatus 101 is watched through one eye from one of the left-eye image regions $VR_L$, only the left-eye images L are seen over the entire screen. Therefore, if the right eye 104 and the left eye 105 of the viewer 106 are located in a right-eye image area $VR_R$ and a left-eye image area $VR_L$, respectively, as shown in FIG. 4, the viewer 6 can recognize a stereoscopic image by fusing those images within his brains. The non-display regions $VR_B$ on both sides of each pair of right-eye image region $VR_R$ and left-eye image region $VR_L$ act in the following manner.

Figure 5A:
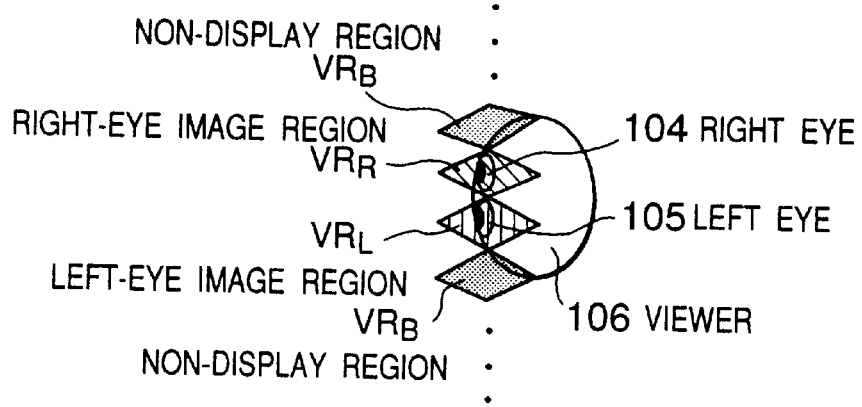
FIGS. 5A, 5B and 5C illustrate the operation of the stereoscopic display apparatus of FIG. 3.
Figure 5B:
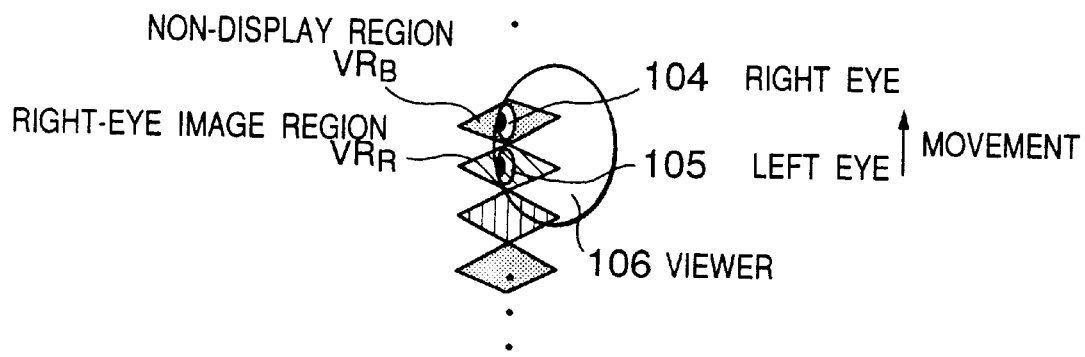
Figure 5C:
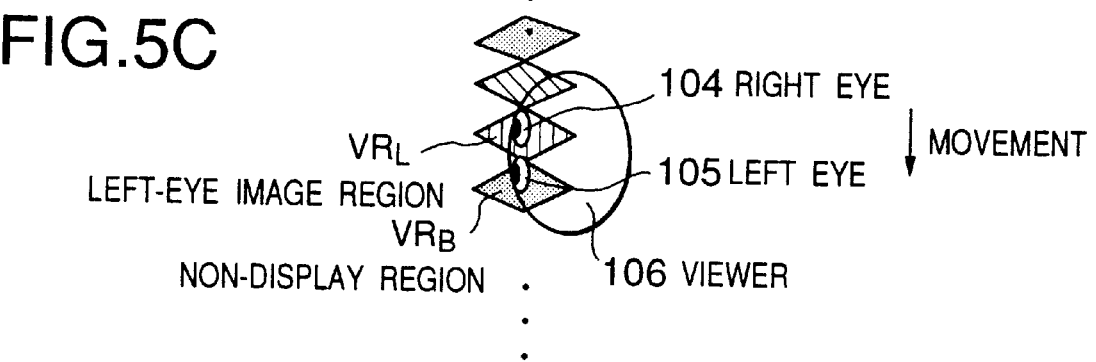

As shown in FIGS. 5A–5C, the right-eye image regions $VR_R$, the left-eye image regions $VR_L$, and the non-display regions $VR_B$ are arranged periodically at the viewing position of the viewer 106. FIG. 5A shows a case where viewer 106 is watching the apparatus 101 at a correct position; the right eye 104 and the left eye 105 of the viewer 106 of the viewer 106 are located in one of right-eye image regions $VR_R$ and one of the left-eye image regions $VR_L$, respectively. In this state, the viewer 106 is capable of stereoscopic vision.

On the other hand, FIG. 5B shows a case where the viewer 106 is moved rightward by about 60–65 mm, i.e., his eye span. In this case, the right eye 104 and the left eye 105 of the viewer 106 are located in one of the non-display regions $VR_B$ and one of the right-eye image regions $VR_R$, respectively. Conversely, FIG. 5C shows a case where the viewer 106 is moved leftward by about 60–65 mm, i.e., his eye span. In this case, the right eye 104 and the left eye 105 of the viewer 106 are located in one of the left-eye image regions $VR_L$ and one of the non-display regions $VR_B$, respectively.

Therefore, in the cases of FIGS. 5B and 5C, the viewer 106 is incapable of stereoscopic vision because he sees an image through only one of his eyes rather than sees an image having a binocular parallax independently through the respective eyes. However, since inverse stereoscopic vision is not established unlike the conventional case, the viewer 106 does not feel fatigued. Further, he sees an image through only one of his eyes, he would realize that he is incapable of stereoscopic vision. Therefore, he can easily return his head to the correct position shown in FIG. 5A.

According to the first embodiment under consideration, the fact that the viewer 106 is located at a correct position where he sees an image through both of his eyes 104 and 105 is determined uniquely. Even when he is located at other positions, inverse stereoscopic vision is not established and hence he does not feel fatigued. Further, since he can easily realize that he is located at a wrong position, he can easily return his head to a correct position.

The display device 102 and the lenticular lens 103 used in the configuration of FIG. 3 will be described below in a specific manner. The display device 102 uses a monochromatic liquid crystal display device in which right-eye images R, left-eye images L, and non-display portions B are displayed periodically on a pixel-by-pixel basis so as to assume stripes extending in the vertical direction of the screen. The right-eye images R and the left-eye images L are parallax images and the non-display portions B are always black irrespective of image information.

The lenticular lens 103 is formed by shaping the surface of an acrylic plate with a metallic mold so that a number of cylindrical lenses are arranged. The cylindrical lenses are arranged approximately at a rate of one piece per three pixels of the display device 102. The apparatus 101 is so designed that the viewer 106 can see a stereoscopic image from a position distant from the apparatus 101 by 600 mm. The lenticular lens 103 is in close contact with the display surface of the display device 102, and is fixed to the latter with an adhesive. Alignment is so made that the groove direction of the lenticular lens 103 becomes parallel with the vertical direction of the screen of the display device 102.

As described above, in the first embodiment having the above components, when the head of a viewer is moved so that his right eye is located at a position for seeing left-eye images, his left eye cannot see any images. Conversely, when the head of the viewer is moved so that his left eye is located at a position for seeing right-eye images, his right eye cannot see any images. Thus, in either case, inverse stereoscopic vision or pseudoscopic vison is not established. Since a position enabling the viewer to see an image through both of his eyes is a position enabling stereoscopic vision, the viewer can easily find a region where he is capable of stereoscopic or orthoscopic vision.

Second Embodiment

Referring to FIG. 6, a stereoscopic display apparatus 201 is constituted of a display device 202 and a parallax barrier 203 including a plurality of transmission slits which is opposed to the front surface of the display device 202 and serves as a parallax image separating means. In the display device 202, as in the case of the first embodiment, right-eye images R and left-eye images L as parallax images and non-display portions B are formed periodically and cyclically so as to have the same width. The apparatus 201 is so constructed that at a certain viewing position a right eye 104 of a viewer can see only the right-eye images R and his left eye 105 can see only the left-eye images L.

As shown in FIG. 7, in the parallax barrier type stereoscopic display apparatus 201 constituted of the display device 202 and the parallax barrier 203, light beams coming from the right-eye images R, left-eye images L, and non-display portions B that are periodically displayed on the display device 202 are converged at certain positions that are distant from the stereoscopic display apparatus 201, to form right-eye image regions $VR_R$, left-eye image regions $VR_L$, and non-display regions $VR_B$ which are arranged periodically. The width of the respective regions is approximately 60–65 mm which is the eye span of a viewer 106.

If the stereoscopic display apparatus 201 is watched through one eye from one of the right-eye image regions $VR_R$, only the right-eye images R are seen over the entire screen. Similarly, if the stereoscopic display apparatus 201 is watched through one eye from one of the left-eye image regions $VR_L$, only the left-eye images L are seen over the entire screen. Therefore, if the right eye 104 and the left eye 105 of the viewer 106 are located in a right-eye image area $VR_R$ and a left-eye image area $VR_L$, respectively, as shown in FIG. 7, the viewer 106 can normally recognize a stereoscopic image by fusing those images within his brains.

In this embodiment, the non-display regions $VR_B$ on both sides of each pair of right-eye image region $VR_R$ and left-eye image region $VR_L$ act in the same manner as in the first embodiment. That is, when the head of the viewer 106 is not located at a correct position shown in FIG. 7, the non-display regions $VR_B$ cause the viewer 106 to see images having a binocular parallax through one of his eyes rather than see those images independently through the respective eyes. Therefore, the fact that the viewer 106 is located at a correct position where he sees an image through both of his eyes 104 and 105 is determined uniquely. Even when he is located at other positions, inverse stereoscopic vision is not established and hence he does not feel fatigued. Further, since he can easily realize that he is located at a wrong position, he can easily return his head to a correct position.

As in the case of the first embodiment, the display device 202 used in the configuration of FIG. 7 uses a monochromatic liquid crystal display element in which right-eye images R, left-eye images L, and non-display portions B are displayed periodically on a pixel-by-pixel basis so as to assume stripes extending in the vertical direction of the screen. The right-eye images R and the left-eye images L are parallax images and the non-display portions B are always black irrespective of image information.

The parallax barrier 203 is constructed such that an opaque metal film is evaporated on a glass plate and striped regions for transmitting light are formed by etching. Openings of the parallax barrier 203 are arranged approximately at a rate of one opening per three pixels of the display device 202. The apparatus 201 is so designed that the viewer 106 can see a stereoscopic image from a position distant from the apparatus 201 by 600 mm. The glass surface of the parallax barrier 203 is in close contact with the display surface of the display device 202, and is fixed to the latter with an adhesive. Alignment is so made that the stripe direction of the parallax barrier 203 becomes parallel with the vertical direction of the screen of the display device 202.

In the stereoscopic display apparatus according to the second embodiment, when the head of a viewer is moved so that his right eye is located at a position for seeing left-eye images, his left eye cannot see any images. Conversely, when the head of the viewer is moved so that his left eye is located at a position for seeing right-eye images, his right eye cannot see any images. Thus, in either case, inverse stereoscopic vision is not established. Since a position enabling the viewer to see an image through both of his eyes is a position enabling stereoscopic vision, the viewer can easily find a region where, he is capable of stereoscopic vision.

Although in the first and second embodiments the parallax image separating means is a lenticular lens or a parallax barrier, the invention is not limited to such cases. For example, a similar stereoscopic display apparatus can be obtained by a means in which a liquid crystal display element is illuminated with a plurality of linear light sources, or a means in which a diffraction grating or a hologram for controlling the light traveling direction is disposed in front of the display device.

Although the first and second embodiments are directed to the stereogram type apparatus in which two kinds of parallax images, i.e., a right-eye image R and a left-eye image L are displayed on the display device 102 or 202, a panoramagram type apparatus which uses three or more parallax images may be constructed in a similar manner by inserting a non-display portion B in each repetition pitch of parallax images.

The display device 102 or 202 is not limited to a monochromatic liquid crystal display element and may be any electronic display. However, the use of a flat panel display such as a liquid crystal display element or a plasma display is desirable because it facilitates alignment between the parallax image separating means and the pixels. The first and second embodiments can be applied to both a color display that is implemented by incorporating color filters in the display device 102 or 202 and a color display in which red, green, and blue images are displayed in a field sequential manner. The display device 102 or 202 is not limited to a direct-view type display device and may be a projection-type display device. Further, the display device 102 or 202 may be either a monochromatic or color display device.

Although in the foregoing the non-display portions B are described as being portions where black is always displayed irrespective of image information, any image may be displayed there as long as it is entirely different from parallax images of right-eye images R and left-eye images L. Alternatively, opaque films such as metal, for instance, may be formed on the non-display portions B of the display device 102 or 202. If the non-display portions B are each equal to or wider than parallax images, the viewer 106 is not given inverse stereoscopic vision (pseudoscopic vision) and can easily recognize a position that enables stereoscopic vision (orthoscopic vision) where he can see an image through both of his eyes.

Third Embodiment

Figure 8:
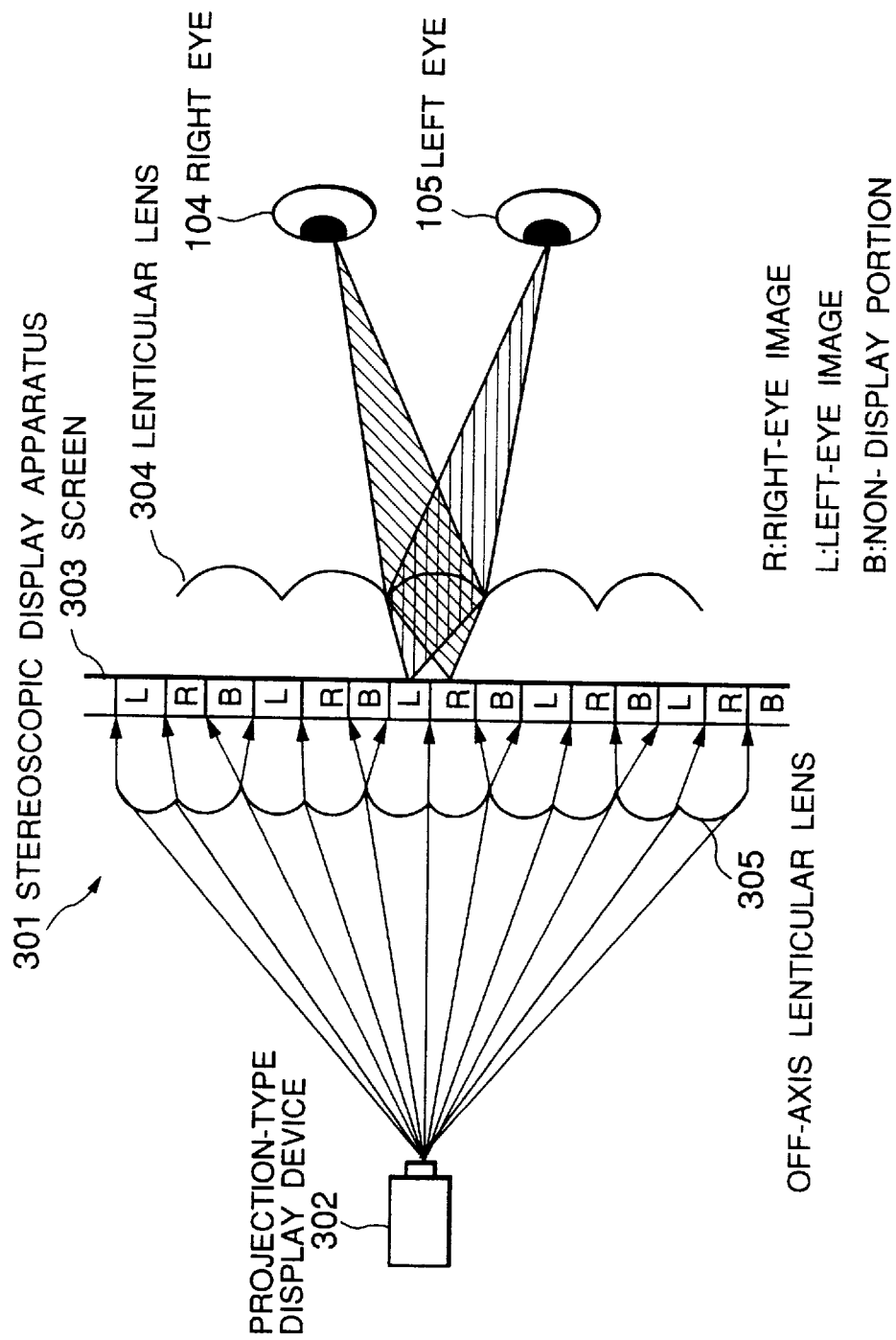
FIG. 8 is a schematic plan view illustrating the configuration of a stereoscopic display apparatus according to a third embodiment of the invention.

Referring to FIG. 8, a stereoscopic display device 301 is constituted of a projection-type display device 302, a rear projection type screen 303, a lenticular lens 304 that is opposed to the front surface of the screen 303 and serves as a parallax image separating means, and an off-axis lenticular lens 305 that is disposed on the display device 302 side of the screen 303 so as to be opposed to the screen 303 and serves as a parallax image deflecting and converging means. The projection-type display device 302 projects light beams toward the screen 303, from which right-eye images R and left-eye images L as parallax images and non-display portions B are formed periodically and cyclically through the off-axis lenticular lens 305 on the screen 303 so as to have the same width. The apparatus 301 is so constructed that at a certain viewing position a right eye 104 of a viewer can see only the right-eye images R and his left eye 105 can see only the left-eye images L.

Figure 9:
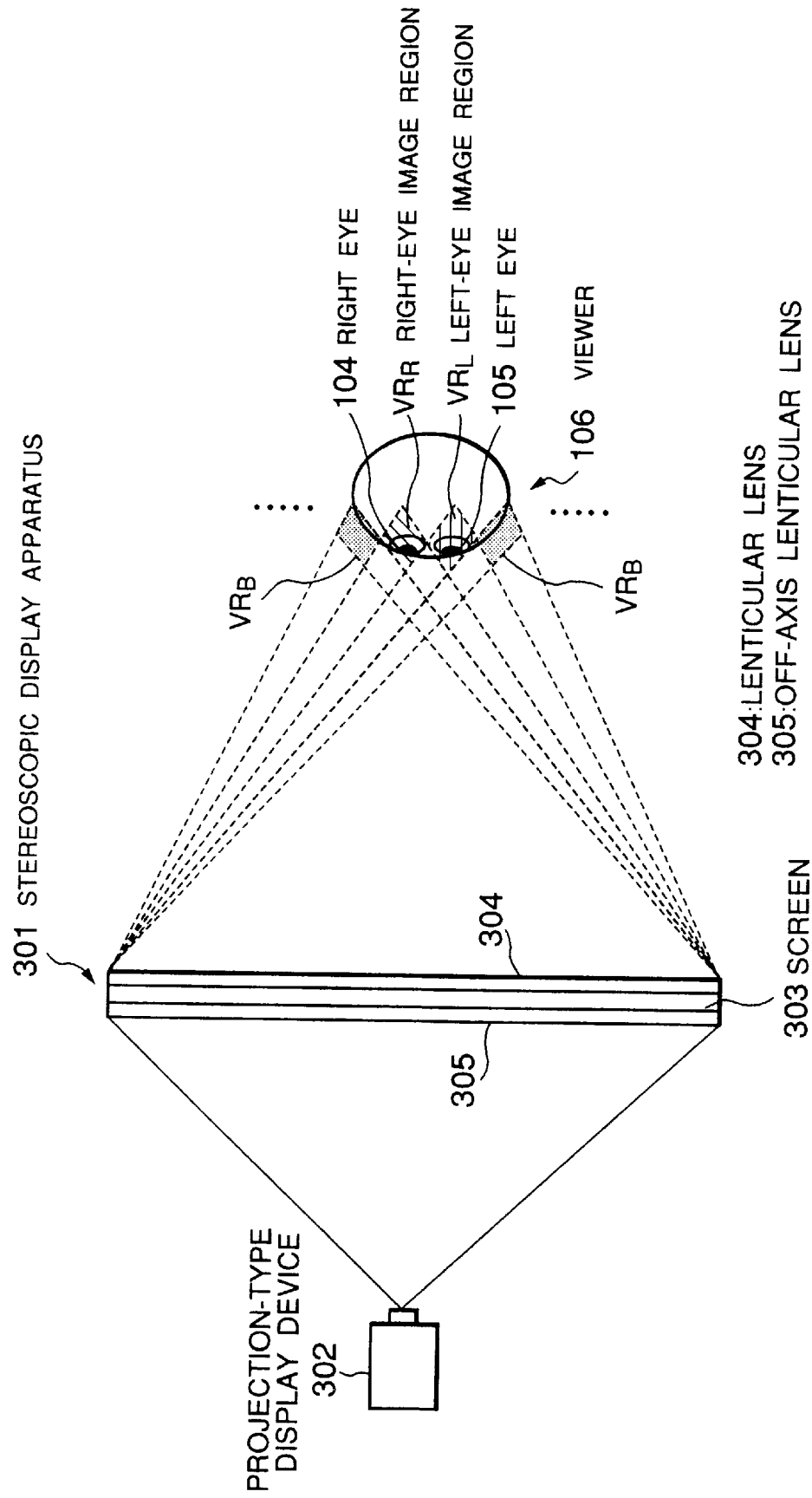
FIG. 9 schematically illustrates viewing regions of the stereoscopic display apparatus of FIG. 8.

As shown in FIG. 9, light beams coming from the right-eye images R, left-eye images L, and non-display portions B projected on the screen 303 are converged at certain positions that are distant from the stereoscopic display apparatus 301, to form right-eye image regions $VR_R$, left-eye image regions $VR_L$, and non-display regions $VR_B$ which are arranged cyclically and periodically. The width of the respective regions is approximately 60–65 mm which is the eye span of a viewer 106.

If the stereoscopic display apparatus 301 is watched through one eye from one of the right-eye image regions $VR_R$, only the right-eye images R are seen over the entire screen. Similarly, if the stereoscopic display apparatus 301 is watched through one eye from one of the left-eye image regions $VR_L$, only the left-eye images L are seen over the entire screen. Therefore, if the right eye 104 and the left eye 105 of the viewer 106 are located in a right-eye image area $VR_R$ and a left-eye image area $VR_L$, respectively, as shown in FIG. 9, the viewer 106 can normally recognize a stereoscopic image by fusing those images within his brains.

In this embodiment, the non-display regions $VR_B$ on both sides of each pair of right-eye image region $VR_R$ and left-eye image region $VR_L$ act in the same manner as in the first and second embodiments. That is, the fact that the viewer 106 is located at a correct position where he sees an image through both of his eyes 104 and 105 is determined uniquely. Even when he is located at other positions, inverse stereoscopic vision is not established and hence he does not feel fatigued. Further, he can easily realize that he is located at a wrong position.

The projection-type display device 302 is a projection-type color liquid crystal display device. Although not shown in FIG. 8, light emitted from a light source is separated into light beams of three primary colors by means of a plurality of dichroic mirrors, and three liquid crystal display elements are illuminated with the respective light beams. Three light beams passed from the respective liquid crystal display elements and modulated with color image signals are combined by a plurality of dichroic mirrors, and a resulting color image is projected and displayed through a single projection lens.

Each liquid crystal display element displays right-eye images R and left-eye images L as parallax images on a pixel-by-pixel basis in the form of stripes extending in the vertical direction of its screen. The focusing of the projection lens in the projection-type display device 302 is adjusted so as to form images on the surface of the off-axis lenticular lens 305. Alignment is so made that the width of one pixel of the projected images becomes equal to that of one cylindrical lens of the off-axis lenticular lens 305 and that their positions coincide with each other.

The screen 303 is a rear projection type screen formed by shaping an acrylic resin containing a diffusing agent into a plate form.

The lenticular lens 304 is formed by shaping the surface of an acrylic plate with a metallic mold so that a number of cylindrical lenses are arranged. The cylindrical lenses are arranged approximately at a rate of one piece per three pixels on the screen 303. The apparatus 301 is so designed that the viewer 106 can see a stereoscopic image from a position distant from the apparatus 301 by 2,000 mm. The lenticular lens 304 is fixed to the screen 303 with a gap formed in between. Alignment is so made that the groove direction of the lenticular lens 304 becomes parallel with the vertical direction of images projected and displayed on the screen 303.

Like the lenticular lens 304, the off-axis lenticular lens 305 is formed by shaping the surface of an acrylic plate with a metallic mold so that a number of cylindrical lenses are arranged. However, the optical axes of two sets of cylindrical lenses, each set including every other cylindrical lens, are deviated in opposite directions to provide a function described below. Like the lenticular lens 304, the off-axis lenticular lens 305 is fixed to the screen 303 with a gap formed in between.

Light beams projected by the projection-type display device 302 are imaged onto the respective cylindrical lenses of the off-axis lenticular lens 305, and then converged onto the screen 303 to form, i.e., display right-eye images R and left-eye images L whose width becomes approximately ⅔ of the width of each cylindrical lens. The right-eye images R and left-eye images L are displayed periodically on a pixel-by-pixel basis so as to correspond to the positions of the cylindrical lenses of the off-axis lenticular lens 305.

By deviating the optical axes of the cylindrical lenses of the off-axis lenticular lenses 305, a pair of right-eye image R and left-eye image L are made adjacent to each other while a region that receives no light is formed in the repetition pitch of the right-eye image R and the left-eye image L. This region having the same width as the right-eye image R and the left-eye image L is a non-display portion B.

In the third embodiment, as in the case of the first and second embodiments, when the head of a viewer is moved so that his right eye is located at a position for seeing left-eye images, his left eye cannot see any images. Conversely, when the head of the viewer is moved so that his left eye is located at a position for seeing right-eye images, his right eye cannot see any images. Thus, in either case, inverse stereoscopic vision is not established because the viewer sees an image through only one of his eyes. Since a position enabling the viewer to see an image through both of his eyes is a position enabling stereoscopic vision, the viewer can easily find a region where he is capable of stereoscopic vision.

In the first and second embodiments, the non-display portions B are formed on the display surface of the display device 102 or 202. In the case of the stereogram type apparatus, the number of pixels of each parallax image is ⅓ of that of the display device 102 or 202. In contrast, in the third embodiment in which the non-display portions B are formed by the off-axis lenticular lens 305 as the parallax image deflecting/converging means, in the case of the stereogram type apparatus, the number of pixels of each parallax image is ½ of that of the projection-type display device 302, i.e., 1.5 times larger than in the first and second embodiments.

Although in the third embodiment the lenticular lens 304 is used as the parallax image separating means, the invention is not limited to such a case. For example, a similar stereoscopic display apparatus can be obtained using a parallax barrier, or a diffraction grating or a hologram for controlling the light traveling direction.

Although the third embodiment is directed to the stereogram type apparatus in which two kinds of parallax images, i.e., a right-eye image R and a left-eye image L are displayed on the projection-type display device 302, a panoramagram type stereoscopic display apparatus which uses three or more parallax images may be constructed in a similar manner by inserting a non-display portion in each repetition pitch of parallax images.

In addition to the projection-type color liquid crystal display device, the projection-type display device 302 may be a projection-type display device using an arbitrary display element such as a display element in which an image is written onto an oil film, a CRT display element, a PLZT display element, or a device element in which light is deflected by a micromirror. The third embodiment can be applied to any of monochrome display, color display that is implemented by incorporating color filters, and color display in which red, green, and blue images are displayed in a field sequential manner.

In addition to the off-axis lenticular lens 305, the parallax image deflecting/converging means may be a means using a diffraction-type optical element such as a hologram or a means in which deflection and converging are effected independently such as a combination of a prism, a diffraction grating, or the like as a deflecting means and a lenticular lens, a linear Fresnel lens, a hologram, or the like as a converging means. In such cases, if the non-display portions B are each equal to or wider than parallax images, the viewer 106 is not given inverse stereoscopic vision and can easily recognize a position that enables stereoscopic vision where he can see an image through both of his eyes.

Fourth Embodiment

Figure 10:
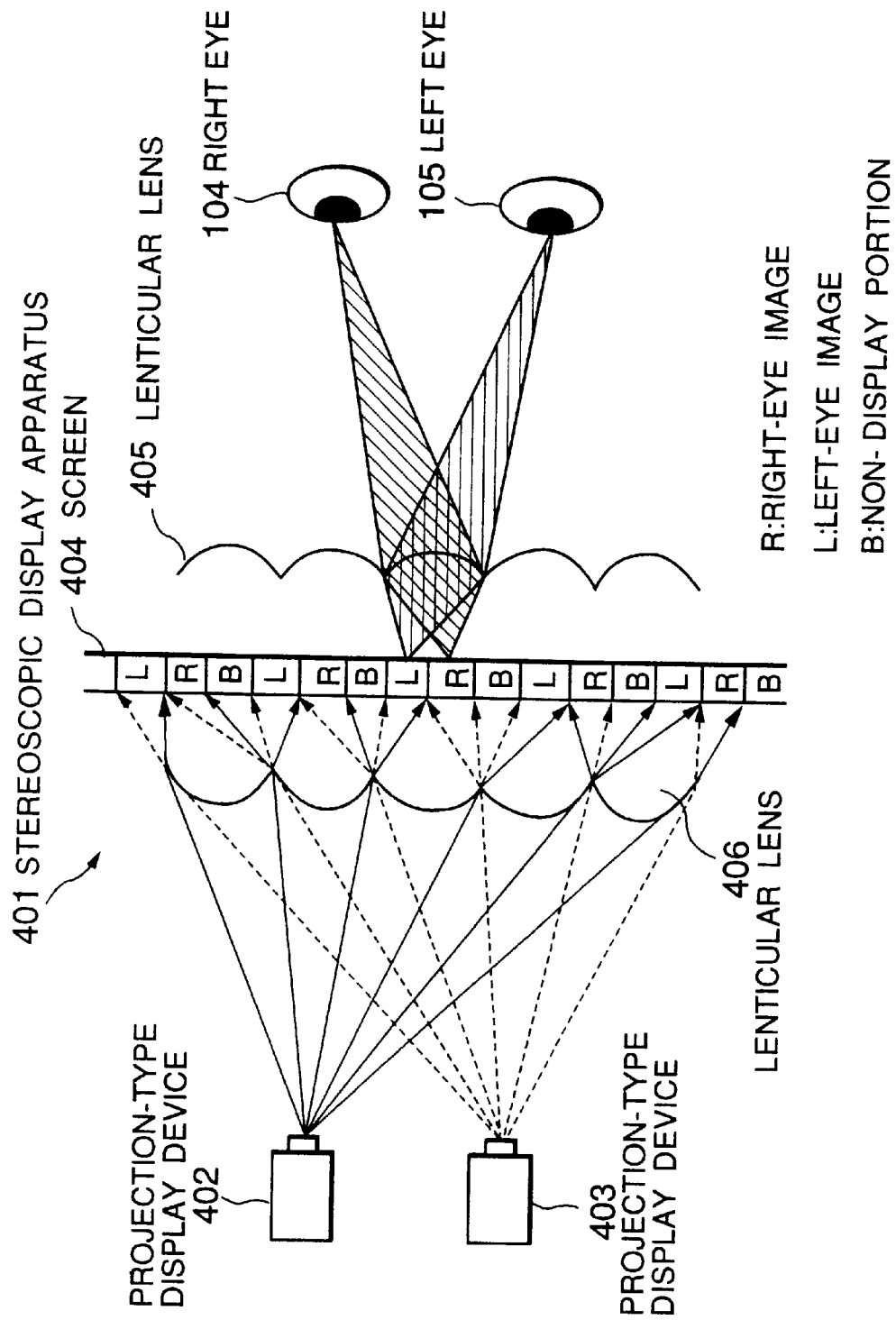
FIG. 10 is a schematic plan view illustrating the configuration of a stereoscopic display apparatus according to a fourth embodiment of the invention.

Referring to FIG. 10, a stereoscopic display device 401 is constituted of projection-type display devices 402 and 403 dedicated to project and display right-eye images R and left-eye images L, respectively, a screen 404, a lenticular lens 405 that is opposed to the front surface of the screen 404 and serves as a parallax image separating means, and a lenticular lens 406 that is disposed on the display devices 402 and 403 side of the screen 404 so as to be opposed to the screen 404 and serves as a parallax image deflecting/converging means.

Right-eye images R and left-eye images L as parallax images and non-display portions B are formed periodically on the screen 404 so as to have the same width. The apparatus 401 is so constructed that at a certain viewing position a right eye 104 of a viewer can see only the right-eye images R and his left eye 105 can see only the left-eye images L.

Figure 11:
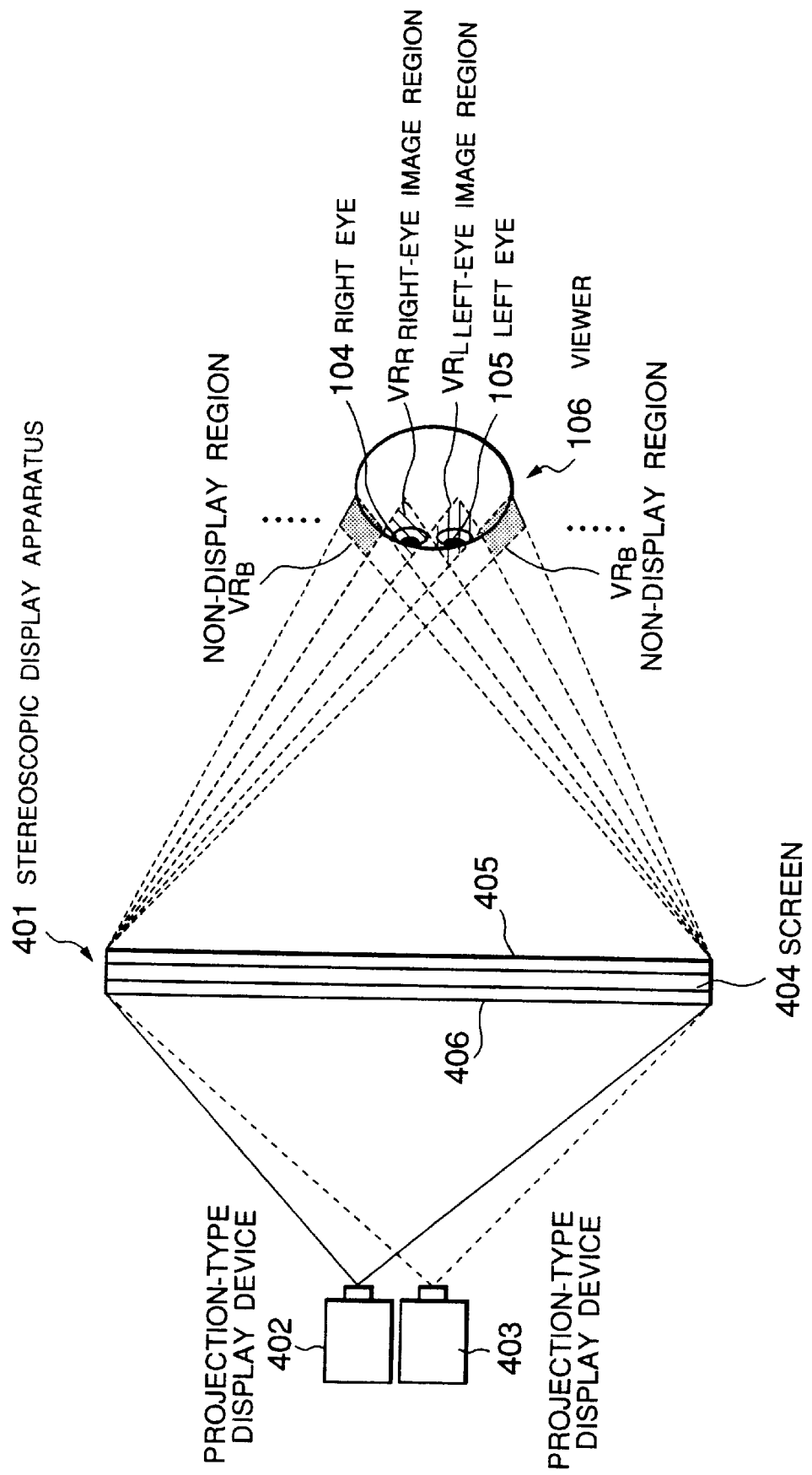
FIG. 11 schematically illustrates viewing regions of the stereoscopic display apparatus of FIG. 10.

As shown in FIG. 11, in the projection/lenticular-type stereoscopic display apparatus 401 constituted of the projection-type display devices 402 and 403, screen 404, and the lenticular lenses 405 and 406, light beams coming from the right-eye images R, left-eye images L, and non-display portions B projected on the screen 404 are converged at certain positions that are distant from the stereoscopic display apparatus 401, to form right-eye image regions $VR_R$, left-eye image regions $VR_L$, and non-display regions $VR_B$ which are arranged periodically. The width of the respective regions is approximately 60–65 mm which is the eye span of a viewer 106.

If the stereoscopic display apparatus 401 is watched through one eye from one of the right-eye image regions $VR_R$, only the right-eye images R are seen over the entire screen. Similarly, if the stereoscopic display apparatus 401 is watched through one eye from one of the left-eye image regions $VR_L$, only the left-eye images L are seen over the entire screen. Therefore, if the right eye 104 and the left eye 105 of the viewer 106 are located in a right-eye image area $VR_R$ and a left-eye image area $VR_L$, respectively, as shown in FIG. 11, the viewer 106 can normally recognize a stereoscopic image by fusing those images within his brains as described in the first to third embodiments.

In this embodiment, the non-display regions $VR_R$ on both sides of each pair of right-eye image region $VR_R$ and left-eye image region $VR_L$ act in the same manner as in the first to third embodiments. That is, the fact that the viewer 106 is located at a correct position where he sees an image through both of his eyes 104 and 105 is determined uniquely. Even when he is located at other positions, inverse stereoscopic vision is not established and hence he does not feel fatigued. Further, he can easily realize that he is located at a wrong position.

Each of the projection-type display devices 402 and 403 is a projection-type color liquid crystal display device similar to that used in the third embodiment. However, instead of causing the single projection-type display device to display the right-eye images R and the left-eye images L on a pixel-by-pixel basis in the form of stripes extending in the vertical direction of the screen as in the case of the third embodiment, the projection-type display device 402 displays the right-eye images R over the entire screen and the projection-type display device 403 displays the left-eye images L over the entire screen.

The focusing of the projection lens in each of the projection-type display devices 402 and 403 is adjusted so as to form projected images on the surface of the lenticular lens 406. Alignment is so made that the width of one pixel of the projected images becomes equal to that of one cylindrical lens of the lenticular lens 406 and that their positions coincide with each other.

As in the case of the third embodiment, the screen 404 is a rear projection type screen formed by shaping an acrylic resin containing a diffusing agent into a plate form.

The lenticular lenses 405 and 406 are formed by shaping the surface of an acrylic plate with a metallic mold so that a number of cylindrical lenses are arranged. In the lenticular lens 405, the cylindrical lenses are arranged approximately at a rate of one piece per three pixels on the screen 404. The apparatus 401 is so designed that the viewer 106 can see a stereoscopic image from a position distant from the apparatus 401 by 2,000 mm. The lenticular lens 405 is fixed to the screen 404 with a gap formed in between. Alignment is so made that the groove direction of the lenticular lens 405 becomes parallel with the vertical direction of images projected and displayed on the screen 404. The lenticular lens 406 is also fixed to the screen 404 with a gap formed in between.

Light beams of right-eye images and light beams of left-eye images projected by the projection-type display devices 402 and 403, respectively, are imaged onto the respective cylindrical lenses of the lenticular lens 406 so as to be superimposed one on another. The imaged light beams are divided, and then converged onto the screen 404 to display right-eye images R and left-eye images L whose width becomes approximately ⅓ of the width of the cylindrical lenses. The right-eye images R and left-eye images L are displayed periodically on a pixel-by-pixel basis so as to correspond to the positions of the cylindrical lenses of the lenticular lens 406. However, since the projection-type display devices 402 and 403 project the images from different locations, right-eye images R and left-eye images L are displayed at different locations on display 404.

By adjusting the projection-type display devices 402 and 403, a pair of right-eye image R and left-eye image L are made adjacent to each other while a region that receives no light is formed in the repetition pitch of the right-eye image R and the left-eye image L. This region having the same width as the right-eye image R and the left-eye image L is a non-display portion B.

In the fourth embodiment, as in the case of the first to third embodiments, when the head of a viewer is moved so that his right eye is located at a position for seeing left-eye images, his left eye cannot see any images. Conversely, when the head of the viewer is moved so that his left eye is located at a position for seeing right-eye images, his right eye cannot see any images. Thus, in either case, inverse stereoscopic vision is not established because the viewer sees an image through only one of his eyes. Since a position enabling the viewer to see an image through both of his eyes is a position enabling stereoscopic vision, the viewer can easily find a region where he is capable of stereoscopic vision.

In this embodiment, the non-display portions B are formed on the screen 404 by using the two projection-type display devices 402 and 403 for projecting the right-eye images R and the left-eye images L, respectively, and projecting those images onto the lenticular lens 406 from the different positions. Therefore, the number of pixels of each parallax image is equal to that of the projection-type display devices 402 and 403, i.e., 3 times larger than in the first and second embodiments and 2 times larger than in the third embodiment. Thus, this embodiment can produce a high-resolution stereoscopic image.

Although in the fourth embodiment the lenticular lens 405 is used as the parallax image separating means, the invention is not limited to such a case. For example, a similar stereoscopic display apparatus can be obtained using a parallax barrier, or a diffraction grating or a hologram for controlling the light traveling direction.

Although the third embodiment is directed to the stereogram type apparatus in which two kinds of parallax images, i.e., a right-eye image R and a left-eye image L are displayed on the projection-type display devices 402 and 403, respectively, a panoramagram type stereoscopic display apparatus which uses three or more parallax images may be constructed in a similar manner by using a plurality of projection-type display devices for displaying a plurality of parallax images, respectively, and inserting a non-display portion in each repetition pitch of parallax images.

In addition to the projection-type color liquid crystal display device, the projection-type display device 402 and 403 may be a projection-type display device using an arbitrary display element such as a display element in which an image is written onto an oil film, a CRT display element, a PLZT display element, or a display element in which light is deflected by a micromirror. The fourth embodiment can be applied to any of a monochrome display, a color display that is implemented by incorporating color filters, and a color display in which red, green, and blue images are displayed in a field sequential manner.

In addition to the lenticular lens 406, the parallax image deflecting/converging means may be a means using a diffraction-type optical element such as a hologram. In such a case, if the non-display portions B are wider than parallax images, the viewer 106 is not given inverse stereoscopic vision and can easily recognize a position that enables stereoscopic vision where he can see an image through both of his eyes.

As described above, according to the invention, a viewer is prevented from being given inverse stereoscopic vision, i.e., prevented from being fatigued due to watching with inverse stereoscopic vision. Further, according to the invention, at viewing positions other than correct ones, a viewer sees an image through only one of his eyes. Therefore, he can easily recognize that he is incapable of stereoscopic vision and hence he can easily find a correct viewing position.

What is claimed is:

1. An apparatus comprising:
   a display device having a front side and a rear side, for displaying a plurality of parallax images each formed by a plurality of pixels and a predetermined image different from the parallax images and formed by a plurality of pixels, the display device displaying the plurality of parallax images and the predetermined image in a manner such that each of the parallax images are cyclically displayed on a pixel-by-pixel basis with the predetermined image to form a periodically repetitive pitch of one pixel of each of the parallax images and one pixel of the predetermined image, wherein each of the parallax images forms a part of a stereoscopic image and wherein the predetermined image is not a part of any stereoscopic image; and a parallax image separator provided on the front side of the display device, for separating the parallax images and the predetermined image displayed on the display device to form a periodic cycle of separate viewable regions at positions distant from the display device wherein only one parallax image or the predetermined image is viewable in each separate region.

2. The apparatus according to claim 1, wherein the display device comprises:

a rear projection type screen;

a projector provided on the rear side of the display device, for projecting light beams of the parallax images to the rear projection type screen; and a parallax image generator provided on the rear side of the display device, for receiving the light beams of the parallax images from the projector and generating the parallax images and the predetermined image on the rear projection type screen in a manner in which the parallax images are cyclically displayed on a pixel-by-pixel basis with the predetermined image to form a repetitive pitch of one pixel of each of the parallax images and one display of the predetermined image.

3. The apparatus according to claim 1, wherein the display device comprises:

a rear projection type screen;

a plurality of projectors provided on the rear side of the display device, each for projecting light beams of the parallax images to the rear projection type screen; and a parallax image generator provided on the rear side of the display device, for receiving the light beams of the parallax images from the projectors, and generating the parallax images and the predetermined image on the rear projection type screen such that the parallax images are cyclically displayed on a pixel-by-pixel basis with the predetermined image to form a repetitive pitch of one pixel of each of the parallax images and one display of the predetermined image.

4. The apparatus according to claim 1, wherein the predetermined image in the repetitive pitch is a monochrome image, a width of the predetermined image being at least that of each of the parallax images.

5. The apparatus according to claim 4, wherein the monochrome image consists of black stripes displayed on the display device.

6. The apparatus according to claim 4, wherein the monochrome image consists of black stripes formed on the display device.

7. The apparatus according to claim 2, wherein the predetermined image generated on the rear projection type screen is a monochrome image, a width of the predetermined image being at least that of each of the parallax images.

8. The apparatus according to claim 7, wherein the monochrome image consists of black stripes generated on the rear projection type screen.

9. The apparatus according to claim 7, wherein the monochrome image consists of opaque stripes formed on the rear projection type screen.

10. The apparatus according to claim 3, wherein the predetermined image generated on the rear projection type screen is a monochrome image, a width of the predetermined image being at least that of each of the parallax images.

11. The apparatus according to claim 10, wherein the monochrome image consists of black stripes generated on the rear projection type screen.

12. The apparatus according to claim 10, wherein the monochrome image consists of opaque stripes formed on the rear projection type screen.

13. A stereoscopic display apparatus comprising:

a display device having a front side and a rear side, for displaying a first parallax image comprising a plurality of first pixel stripes, a second parallax image comprising a plurality of second pixel stripes and a blank portion comprising a plurality of blank pixel stripes such that a first pixel stripe, a second pixel stripe and a blank pixel stripe are sequentially repeated and displayed on screen, wherein the first and second parallax images each form a part of a stereoscopic image and the blank portion is not a part of any stereoscopic image; and a parallax image separator provided on the front side of the display device, for separating the first parallax image, the second parallax image and the blank portion displayed on the display device to form a periodic cycle of a first parallax image region, a second parallax image region and a blank region which is viewable at positions distant from the display device.

14. The stereoscopic display apparatus according to claim 13, wherein the blank portion is a monochrome image, a width of each blank pixel stripe being equal to or greater than that of each of the first and second parallax pixel stripes.

15. The stereoscopic display apparatus according to claim 14, wherein the blank portion is a black-colored image displayed on the display device.

16. The stereoscopic display apparatus according to claim 14, wherein the blank portion is a black-colored image formed on the display device.

17. The stereoscopic display apparatus according to claim 13, wherein the parallax image separator comprises a lenticular lens which includes a plurality of cylindrical lenses each parallel to a respective first pixel stripe, a respective second pixel stripe and a respective blank pixel stripe.

18. The stereoscopic display apparatus according to claim 13, wherein the parallax image separator comprises a parallax barrier which includes a plurality of transmission slits each parallel to a respective first pixel stripe, a respective second pixel stripe and a respective blank pixel stripe.

19. The stereoscopic display apparatus according to claim 13, wherein the display device comprises:

a rear projection type screen;

a projector provided on the rear side of the display device, for projecting light beams of the first and second parallax images to the rear projection type screens; and a parallax image generator provided on the rear side of the display device, for receiving the light beams of the first and second parallax images from the projector and generating the first and second parallax images and the blank portion on the rear projection type screen.

20. The stereoscopic display apparatus according to claim 19, wherein the parallax image generator comprises a deflection focusing element for forming the first pixel stripes, the second pixel stripes and the blank pixel stripes according to a periodic cycle.

21. The stereoscopic display apparatus according to claim 20, wherein the deflection focusing element is an off-axis lenticular lens.

22. The stereoscopic display apparatus according to claim 13, wherein the display device comprises:
 a rear projection type screen;
 a first projector provided on the rear side of the display device, for projecting light beams of the first parallax image to the rear projection type screen;
 a second projector provided on the rear side of the display device, for projecting light beams of the second parallax image to the rear projection type screen; and
 a parallax image generator provided on the rear side of the display device, for receiving the light beams of the first and second parallax images from the first and second projectors, respectively, and generating the first and second parallax images and the blank portion on the rear projection type screen, the blank portion being generated in accordance with the positions of the first and second projectors.

23. The stereoscopic display apparatus according to claim 22, wherein the parallax image generator comprises a deflection focusing element for forming the first pixel stripes, the second pixel stripes and the blank pixel stripes according to a periodic cycle.

24. The stereoscopic display apparatus according to claim 23, wherein the deflection focusing element is a lenticular lens.

25. The stereoscopic display apparatus according to claim 22, wherein a width of each blank pixel stripe is determined according to a distance between the first projector and the second projector.

26. A method for generating a stereoscopic image from a plurality of parallax images each formed by a plurality of pixels, the method comprising the steps of:
 displaying the parallax images and a predetermined image different from the parallax images and formed by a plurality of pixels, such that each of the parallax images are cyclically displayed on a pixel-by-pixel basis with the predetermined image to form a periodically repetitive display pitch of one pixel of each of the parallax images and one pixel of the predetermined image, wherein each of the parallax images forms a part of a stereoscopic image and wherein the predetermined image never forms a part of any stereoscopic image; and
 generating a periodic cycle of separate viewable regions at positions distant from the display device by separating the parallax images and the predetermined image displayed on the display device, wherein only one parallax image or the predetermined image is viewable in each separate region.

27. The method according to claim 26, wherein the parallax images and the predetermined image are displayed on a rear projection type screen by the steps of:
 projecting light beams of the parallax images to the rear projection type screen; and
 generating the parallax images and the predetermined image on the rear projection type screen such that the parallax images are cyclically displayed on a pixel-by-pixel basis with the predetermined image to form a periodically repetitive pitch of one pixel of each of the parallax images and one pixel of the predetermined image.

28. The method according to claim 26, wherein the parallax images and a predetermined image are displayed on a rear projection type screen by the steps of:
 projecting light beams of the parallax images from separate projectors to the rear projection type screen;
 adjusting a distance between the separate projectors; and
 generating the parallax images and the predetermined image on the rear projection type screen such that the parallax images are cyclically displayed on a pixel-by-pixel basis with the predetermined image to form a periodically repetitive display pitch of one pixel of each of the parallax images and one pixel of the predetermined image.

* * * * *